(12) United States Patent
Tumminaro et al.

(10) Patent No.: US 8,179,699 B2
(45) Date of Patent: May 15, 2012

(54) METHOD FOR CONTROLLING A SWITCHING REGULATOR AND RELATED SWITCHING REGULATOR

(75) Inventors: Salvatore Tumminaro, Marianopoli (IT); Salvatore Giombanco, Cassaro (IT); Alfio Pasqua, Piedimonte Etneo (IT); Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 66 days.

(21) Appl. No.: 12/347,889

(22) Filed: Dec. 31, 2008

(65) Prior Publication Data

US 2010/0164443 A1 Jul. 1, 2010

(51) Int. Cl.
*H02M 3/335* (2006.01)

(52) U.S. Cl. ...................... 363/20; 363/21.02; 363/21.04

(58) Field of Classification Search .............. 363/20, 363/21.01, 21.04, 21.07, 21.09, 21.12, 21.15, 363/21.17
See application file for complete search history.

(56) References Cited

U.S. PATENT DOCUMENTS

| | | | |
|---|---|---|---|
| 4,885,673 A | 12/1989 | Philippe | |
| 5,184,289 A | 2/1993 | Bonnet et al. | |
| 5,412,556 A | 5/1995 | Marinus | |
| 5,499,184 A * | 3/1996 | Squibb | 363/100 |
| 5,657,211 A | 8/1997 | Brockmann | |
| 5,729,443 A | 3/1998 | Pavlin | |
| 5,995,384 A * | 11/1999 | Majid et al. | 363/21.18 |
| 6,208,532 B1 | 3/2001 | Preller | |
| 6,295,214 B1 | 9/2001 | Matsumoto et al. | |
| 6,469,484 B2 | 10/2002 | L'Hermite et al. | |
| 6,590,789 B2 | 7/2003 | Bailly | |
| 7,075,806 B2 | 7/2006 | Ichikawa et al. | |
| 7,397,678 B2 | 7/2008 | Frank et al. | |
| 7,529,105 B1 * | 5/2009 | Choi et al. | 363/21.12 |
| 7,898,823 B2 | 3/2011 | Wu | |
| 2005/0002207 A1 | 1/2005 | Eriksson | |
| 2005/0254268 A1 | 11/2005 | Reinhard et al. | |
| 2008/0043496 A1 | 2/2008 | Yang | |
| 2008/0259652 A1 * | 10/2008 | Huynh et al. | 363/21.12 |
| 2009/0141520 A1 | 6/2009 | Grande et al. | |
| 2009/0175057 A1 | 7/2009 | Grande et al. | |

OTHER PUBLICATIONS

STmicroelectronics, Inc., AN1061 Application Note, 2005, pp. 1-21, Rev. 9, www.st.com.
STmicroelectronics, Inc., TSM1052, Datasheet, Feb. 2008, pp. 1-15, www.st.com.
STmicroelectronics, Inc., VIPer53-E, Datasheet, Nov. 2006, pp. 1-36, www.st.com.

* cited by examiner

*Primary Examiner* — Adolf Berhane
*Assistant Examiner* — Emily Pham
(74) *Attorney, Agent, or Firm* — Graybeal Jackson LLP

(57) ABSTRACT

An embodiment of a power-supply controller comprises a switching-control circuit, an error amplifier, and a signal generator. The switching-control circuit is operable to control a switch coupled to a primary winding of a transformer, and the error amplifier has a first input node operable to receive a feedback signal, a second input node operable to receive a comparison signal, and an output node operable to provide a control signal to the switching-control circuit. The signal generator is operable to generate either the feedback signal or the comparison signal in response to a compensation signal that is isolated from a secondary winding of the transformer and that is proportional to a load current through a conductor disposed between the secondary winding and a load.

67 Claims, 14 Drawing Sheets

METHOD FOR CONTROLLING A SWITCHING REGULATOR AND RELATED SWITCHING REGULATOR

TECHNICAL FIELD

An embodiment of the disclosure relates to techniques for generating a controlled voltage and more particularly to the methods for controlling a switching regulator.

BACKGROUND

A block diagram of a voltage regulator that supplies a load L through a cable C is depicted in FIG. 1. A control system keeps the voltage generated by the converter at a constant value when changes of the input voltage Vin and/or the load L occur.

Optionally, a second control system may be present to regulate the current delivered by the converter.

The two control systems are mutually exclusive: if the current demanded by the load is lower than the current regulation setpoint, the voltage control system will regulate the output voltage and the current control system will be inoperative; contrarily, the current control system will take over and the voltage loop will be inoperative. Voltage control and, when present, current control use a closed-loop negative feedback: the voltage generated by the converter and current through the load, respectively $V_{OUT}$ and $I_{OUT}$, are fed back to the error amplifiers EAV and EAC and they are compared with their references $V_{REF}$ and $I_{REF}$, respectively.

The input signals $V_{CV}$, $V_{CC}$ to the controller come from the error amplifiers that sense the difference between reference values ($V_{REF}$ and $I_{REF}$) and the feedback signals ($V_{OUT}$ and $I_{OUT}$). Depending on the input signals, the controller generates a PWM signal that drives power switches. Through a transformer, an output rectifier and a filter, energy is transferred from the supply voltage source $V_{IN}$ to the load L. The diagram shown in FIG. 1 is quite general and may have several possible alternative embodiments.

Typically, energy is transferred to the load through a cable C. The voltage control loop keeps the voltage Vout regulated but, depending on the output current, the voltage on the load, $V_{LOAD}$, will be affected by a voltage drop along the cable, out of the control loop. Thus if a zero load regulation is to be achieved, it may be necessary to compensate the drop along the cable in some way.

A simple known way of meeting this potential need is illustrated in FIG. 2 and consists in using an additional sensing wire to sense the voltage $V_{LOAD}$. In this way a zero load regulation may be achieved, but an additional wire is needed. A three-wire cable is not as common as a two-wire one and may be more expensive.

Another solution, that avoids the need of additional wires, is to adjust the voltage loop reference ($V_{REF}$) by an amount proportional to the average output current, the value of which can be sensed directly even with a remote load. Cable drop compensation (briefly CDC) can be performed if the value of the cable resistance $R_{cable}$ is known. This solution is depicted in FIG. 3.

The transfer function of the CDC block is:

$$V'_{REF}=V_{REF}+k_{CDC}\cdot I_{OUT},$$

where $k_{CDC}$ is the cable drop compensation gain and $V'_{REF}$ is the adjusted reference.

In the circuit of FIG. 1, during voltage regulation, it is:

$$V_{OUT}=k_{CV}\cdot V_{REF} \text{ and } V_{LOAD}=V_{OUT}-R_{cable}\cdot I_{OUT},$$

where $k_{CV}$ is the voltage loop gain, $V_{OUT}$ is the regulated voltage and $V_{LOAD}$ is the real voltage on the load.

With reference to the diagram of the FIG. 3 the output voltage is:

$$V'_{OUT}=k_{CV}\cdot V'_{REF}=k_{CV}(V_{REF}+k_{CDC}\cdot I_{OUT})=V_{OUT}+k_{CV}\cdot k_{CDC}\cdot I_{OUT}.$$

As the resistance $R_{cable}$ is known by the application, the $k_{CDC}$ value is chosen in order to satisfy the condition $V_{LOAD}=V_{OUT}$, hence:

$$k_{CV}\cdot k_{CDC}=R_{cable} \Rightarrow k_{CDC}=\frac{R_{cable}}{k_{CV}}.$$

Typically, the output current is sensed directly.

A common way of sensing the output current and adjusting the voltage reference proportionally in a non-isolated step-down switching converter is illustrated in FIG. 4 (from the STMicroelectronics AN1061 applications note, all versions of which are incorporated by reference). In particular, by connecting the resistor $R_K$ as shown in FIG. 4, it is possible to adjust the voltage reference value by shifting the ground voltage of the IC by an amount proportional to the current $I_{LOAD}$.

A similar technique applied to an isolated flyback switching converter is shown in FIG. 5 (from the STMicroelectronics TSM1052 datasheet, all versions of which are incorporated by reference). Only the secondary side is shown; $V_{OUT}$ and $I_{OUT}$ are sensed and compared against their respective references; the error signal (of the loop in control) is transferred to the primary side via an optocoupler, where it is properly handled.

A typical isolated flyback configuration using the optocoupler to transfer the output information from secondary side to the primary one is shown in FIG. 6 (from the STMicroelectronics Viper53 datasheet, all versions of which are incorporated by reference).

There is a special class of low-cost isolated converters, in which output voltage regulation is quite loosely specified and use a simpler approach, according to which there is no sensing element or any reference on the secondary side and, therefore, no specific means for crossing the isolation barrier to transfer the error signal to the primary side, as depicted in FIG. 7 (from the STMicroelectronics Viper53 datasheet, all versions of which are incorporated by reference). In these systems, the voltage drop along the output cable adds to their inherently poor load regulation and can make unacceptable the use of such low-cost systems. In this case, a cable drop compensation circuit would make the difference. However, there is no known technique to compensate the cable resistance for this type of switching converter.

SUMMARY

It has been found that it is possible to use the technique of adjusting the voltage reference even in flyback switching converters that do not have any voltage or current sensing means on the secondary side, and also do not have means for transferring an error signal from the secondary side to the primary side of the converter.

It has been demonstrated that the average output current delivered by the converter may be accurately estimated using signals available on the primary side, by providing a dedicated circuit block for estimating such a value.

More precisely, the average output current $I_{OUT}$ is proportional to the product of Is and the ratio $T_{ONSEC}/T$ wherein $I_S$ is the secondary peak current, $T_{ONSEC}$ is the time during which the secondary current is flowing and T is the switching cycle.

It has been found that signals accurately proportional to the ratio $T_{ONSEC}/T$ and to $I_S$ can be extracted from the primary side in any switching converter with primary feedback, thus it is not necessary to use dedicated sensors nor means for crossing the isolation barrier from the secondary side to the primary side.

For example, a signal accurately proportional to the ratio $T_{ONSEC}/T$ may be produced in different alternative ways:

measuring, with counters or with any other suitable digital means, the time interval $T_{ONSEC}$ in which the logic control signal that flags the beginning and the end of demagnetization phases is active and the duration T of the switching period; and calculating the ratio between the above times for producing a signal the level of which represents the ratio $T_{ONSEC}/T$.

As an alternative, a signal proportional to the ratio $T_{ONSEC}/T$ may be produced by integrating over each switching period the logic control signal that flags the beginning and the end of demagnetization phases.

Another signal proportional to the ratio $(T_{ONSEC}/T)^{-1}$ may be obtained using the charge voltage of a filter capacitor on the primary side of the switching regulator that is discharged during each demagnetization phase by a resistor and is charged by a constant current in the remaining part of each switching period.

These signals representative of the current delivered to a load are used for estimating the voltage drop on the cable that connects the regulator to the load. Therefore, it is possible to control the effective voltage on the load instead of the voltage generated on the secondary side by the switching regulator.

Embodiments of the techniques herein described for estimating the output current of a flyback switching regulator without using sensing elements on the secondary side may be used also for other useful purposes.

DETAILED DESCRIPTION

Figure 8:
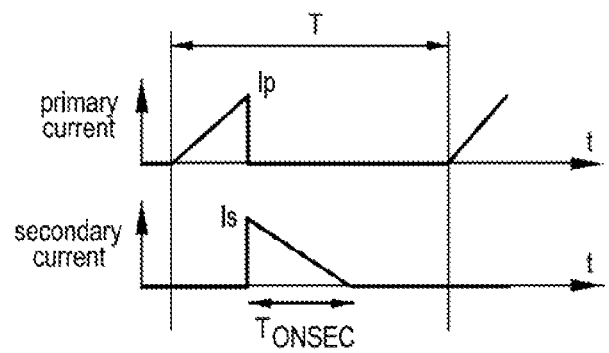
FIG. 8 is a graph of typical current waveforms in the primary side and in the secondary side of a flyback switching regulator.

Primary and secondary sample current waveforms of a flyback switching converter working in discontinuous mode are depicted in FIG. 8. It will be assumed that its PWM modulator uses a current mode control. The average output current $I_{OUT}$ is:

$$I_{OUT} = \frac{I_S}{2} \cdot \frac{T_{ONSEC}}{T},$$

where, $I_S$ is the secondary peak current, $T_{ONSEC}$ is the time during which the secondary current is flowing, and T is the switching-cycle period.

By adding a dedicated circuit, able to estimate the ratio $T_{ONSEC}/T$, in the current mode IC controller, it is possible to calculate the $I_{OUT}$ value by the above formula. This approach may be applied to any current-mode-controlled switching converter with primary feedback.

In order to better understand the gist of this technique, the functioning of an off-line all-primary-sensing switching regulator, disclosed in U.S. Pat. Nos. 5,729,443 and 6,590,789 (which are incorporated by reference) will be discussed.

Figure 9:
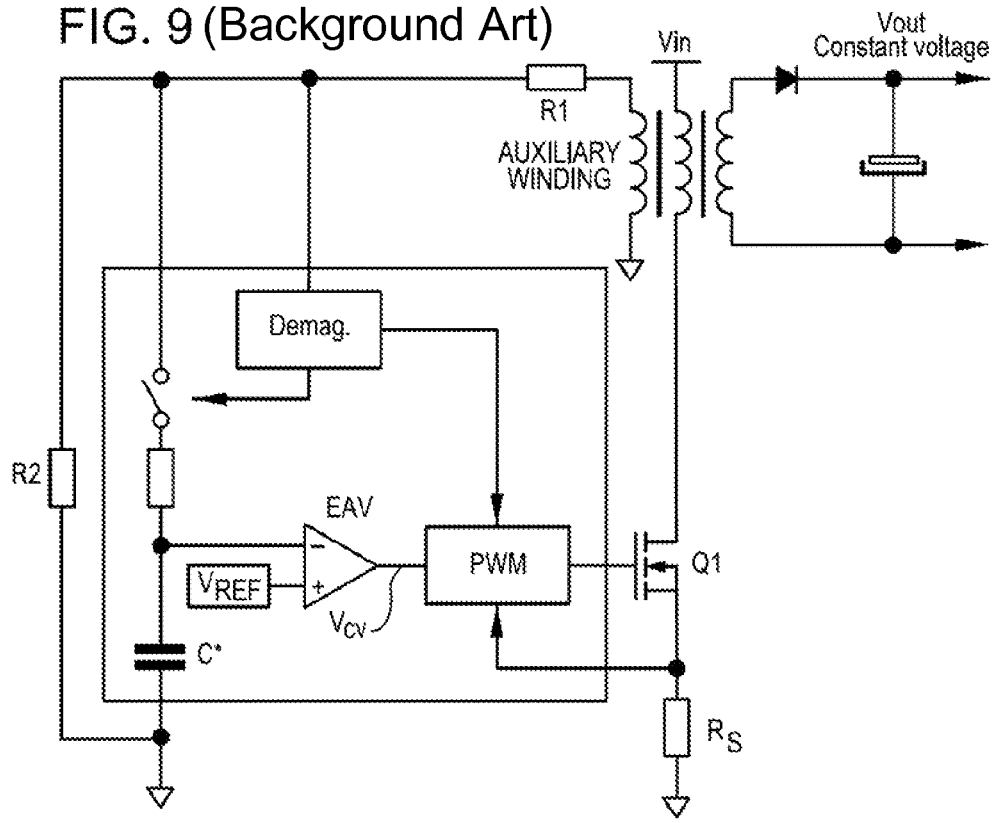
FIG. 9 reproduces a Zero Voltage Switching regulator disclosed in U.S. Pat. No. 6,590,789, which is incorporated by reference.
Figure 10:
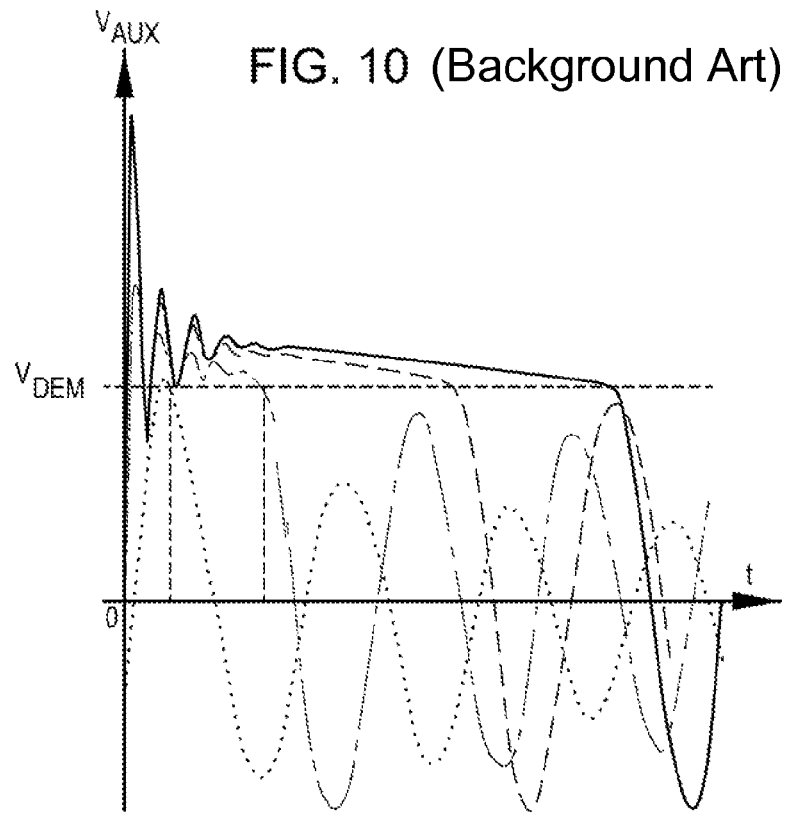
FIG. 10 depicts sample waveforms of the voltage across an auxiliary winding of the circuit of FIG. 9 for several values of the current absorbed by the load.

An equivalent high-level circuit scheme of the switching regulator disclosed in U.S. Pat. No. 6,590,789 for regulating the output voltage is reproduced in FIG. 9. An accurate image of the output voltage is obtained by sampling the voltage on the auxiliary winding immediately at the end of transformer's demagnetization phase, as illustrated in the graph of FIG. 10. The switch Q1 is turned on after the end of the demagnetization phase and then turned off by a comparator that monitors the source current of Q1 using a sense resistor $R_S$.

Figure 11:
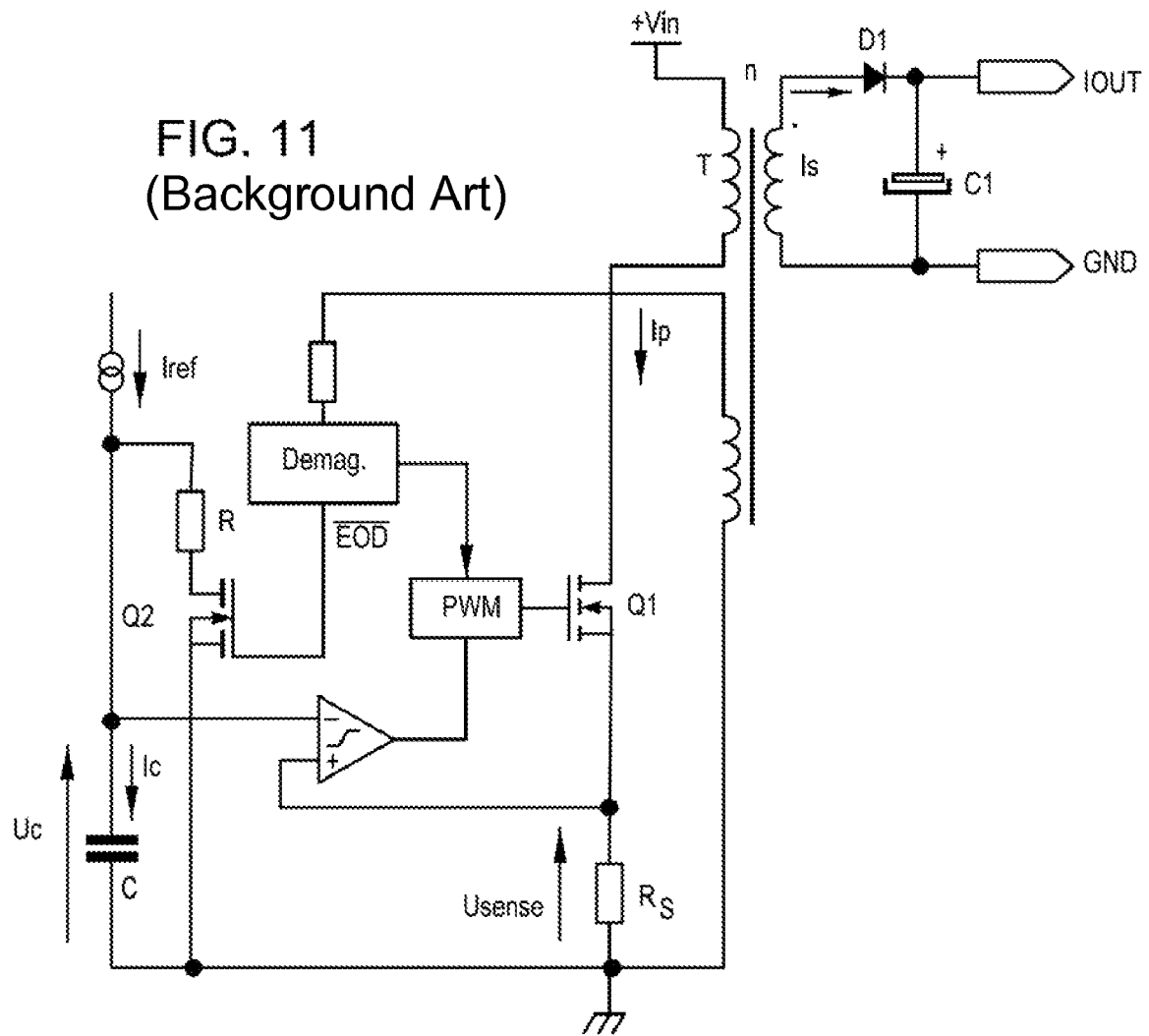
FIG. 11 reproduces a Zero Voltage Switching regulator disclosed in U.S. Pat. No. 5,729,443, which is incorporated by reference.

An equivalent high level circuit scheme of the switching regulator disclosed in U.S. Pat. No. 5,729,443 for regulating the output current is reproduced in FIG. 11. The switch Q1 is operated by the PWM signal, set by the end of the demagnetization phase of the transformer, and reset by a comparator that monitors the source current of Q1 through the sense resistor $R_S$.

Figure 12:
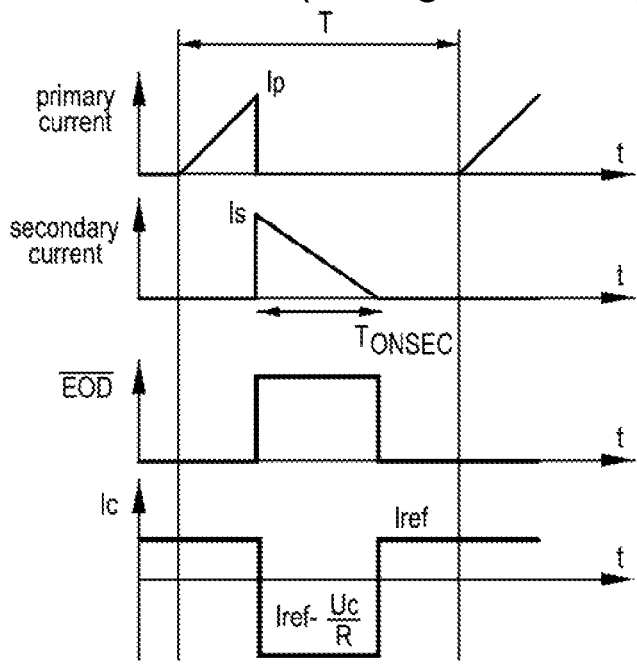
FIG. 12 is a graph of typical waveforms of the main signals of a Zero Voltage Switching regulator of FIG. 11.

The voltage of an auxiliary winding is used by a demagnetization block DEMAG through a protection resistor. The demagnetization block DEMAG generates a logic flag $\overline{EOD}$ that is high as long as the transformer delivers current to secondary side. Waveforms of the currents in the primary side and in the secondary side of the regulator, of the logic flag $\overline{EOD}$, and of the current $I_C$ through the filter capacitor C during a switching period, are shown in FIG. 12.

The logic flag $\overline{EOD}$ is used to turn on and off a MOSFET switch Q2 for discharging/charging the filter capacitor C. A resistor R in series with it absorbs a current $U_C/R$, where $U_C$ is the voltage across the capacitor C. This capacitor C filters the charge current $I_{REF}$ and the discharge current $(I_{REF}-U_C/R)$ so that $U_C$ is practically a DC voltage, that is applied to an input of the current mode comparator.

At steady state, the average current $I_C$ is zero. If $T_{ONSEC}$ is the time during which the secondary current $I_S$ is flowing, it is:

$$I_{REF} \cdot (T - T_{ONSEC}) + \left(I_{REF} - \frac{U_C}{R}\right) \cdot T_{ONSEC} = 0,$$

which can be simplified in:

$$U_C = R \cdot I_{REF} \cdot \frac{T}{T_{ONSEC}} \quad (1)$$

The voltage $U_C$ is then used to set the peak primary current $I_p$:

$$I_P = \frac{U_C}{R_S},$$

which defines the peak secondary current $I_S$:

$$I_S = n \cdot I_P = n \cdot \frac{U_C}{R_S} \quad (2)$$

The average output current $I_{OUT}$ can be expressed as:

$$I_{OUT} = \frac{I_S}{2} \cdot \frac{T_{ONSEC}}{T} \quad (3)$$

By combining the previous equations, we obtain:

$$I_{OUT} = \frac{n}{2} \cdot \frac{R \cdot I_{REF}}{R_S}.$$

Thus it is possible to set the average output current of the switching regulator by fixing the reference current $I_{REF}$ and the resistances R and $R_S$.

It has been found that a signal proportional to the output current can be generated by using signals already available in the primary side of the converter.

Indeed, combining equations (1) and (3), leads to the following expression:

$$U_C = \frac{R \cdot I_{REF}}{2} \cdot \frac{I_S}{I_{OUT}} \quad (4)$$

Hence the charge voltage of the filter capacitor contains information concerning the average output current, thus it can be used for compensating the voltage drop on the cable that connects a load to a flyback switching regulator.

Figure 1:
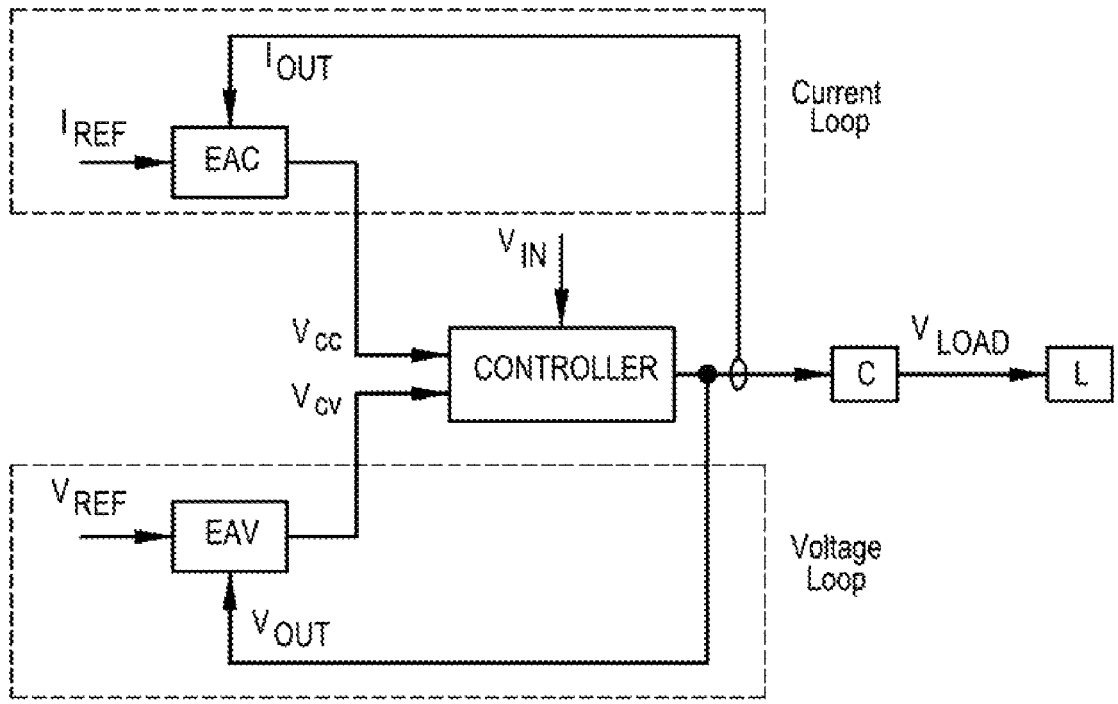
FIG. 1 depicts a known architecture of a voltage regulator.
Figure 2:
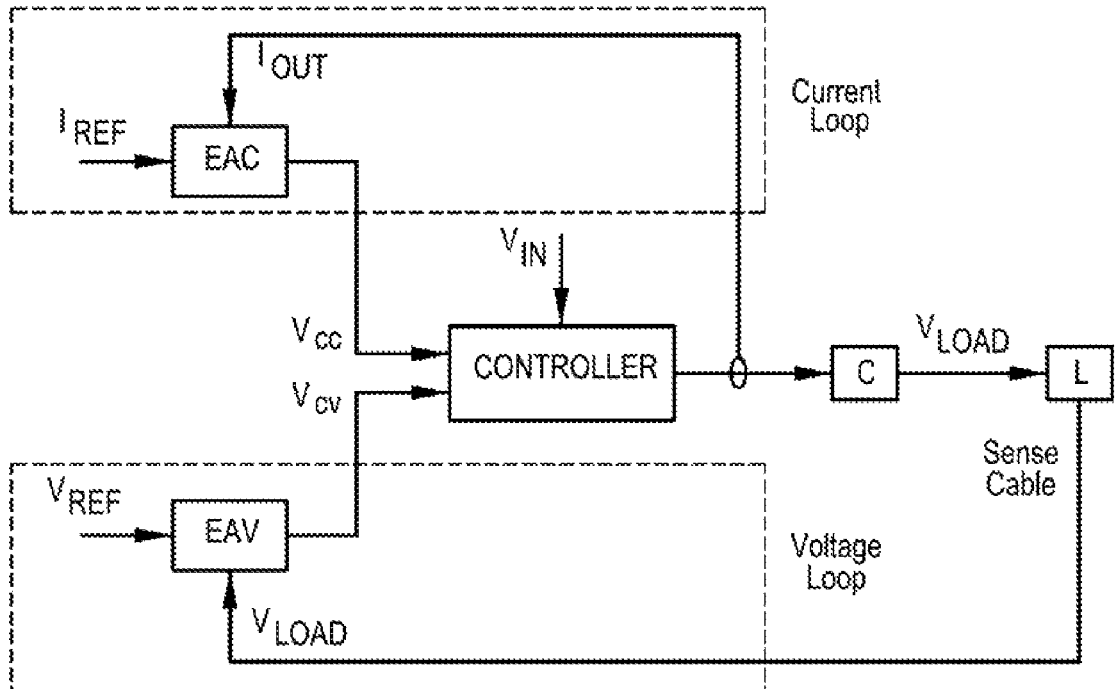
FIG. 2 depicts a known architecture of a voltage regulator using an additional sensing wire.
Figure 3:
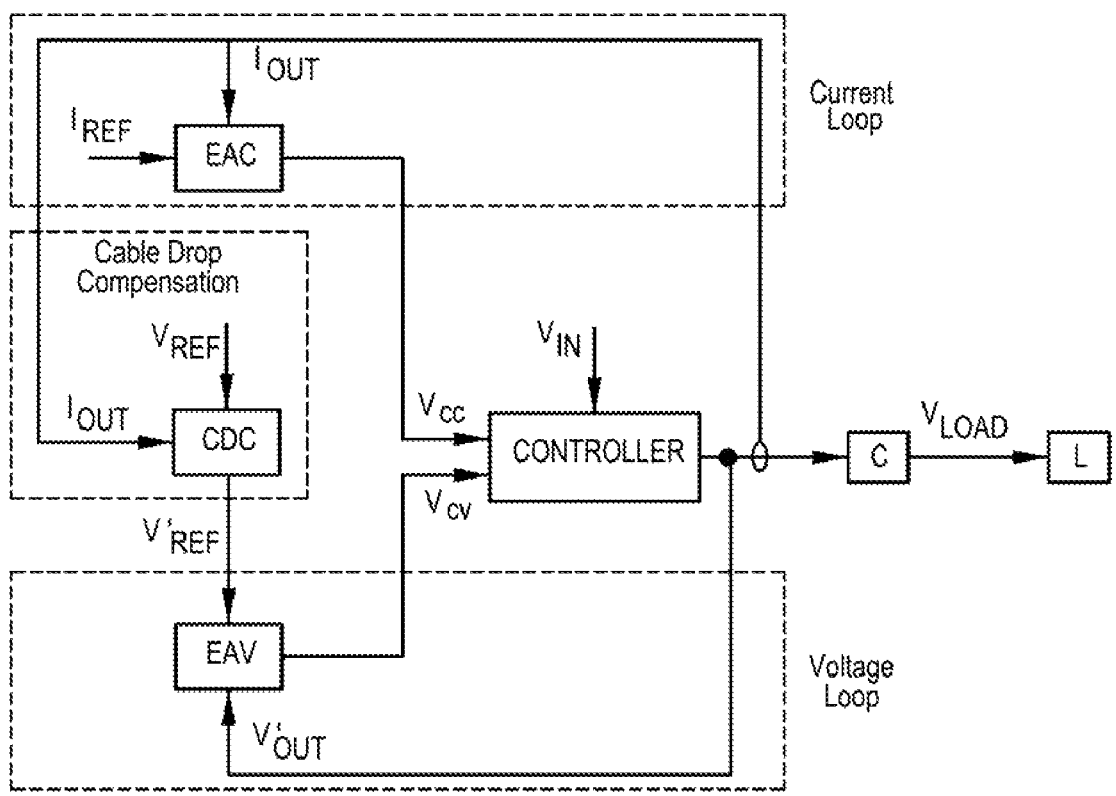
FIG. 3 depicts a known architecture of a voltage regulator with a compensation circuit for the voltage drop on the cable that connects the output of the regulator to a load.
Figure 4:
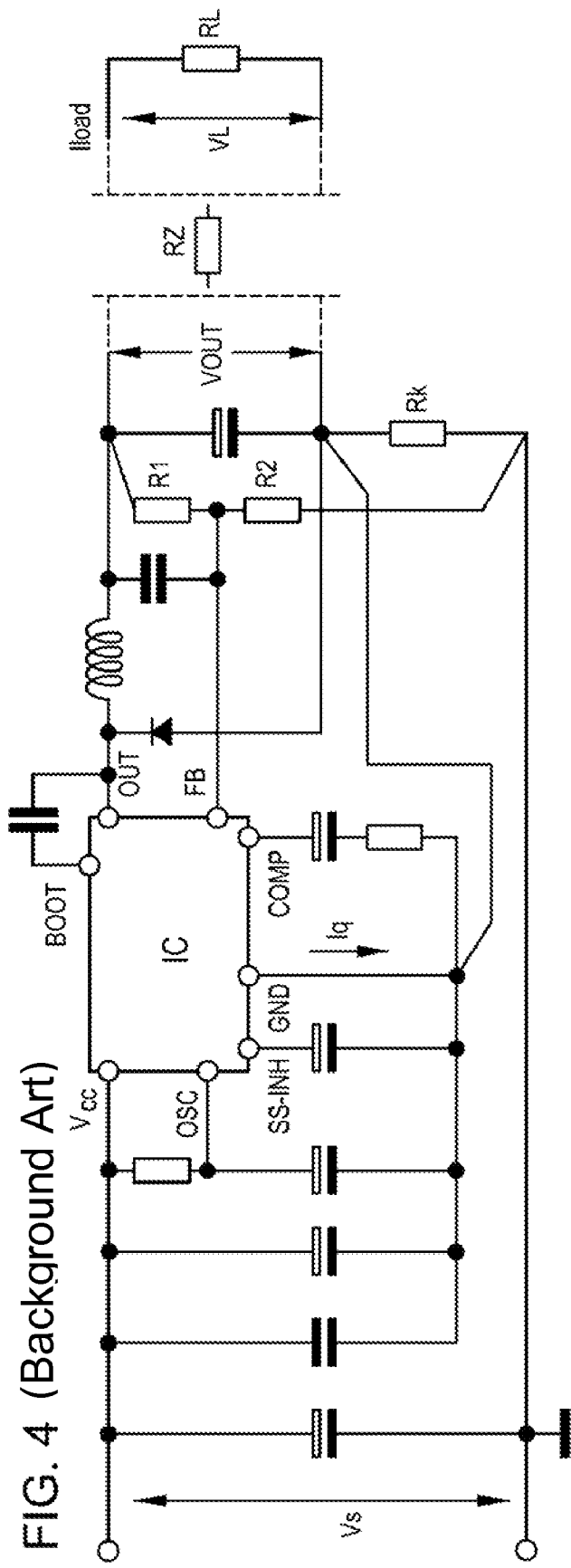
FIG. 4 depicts a known architecture of a voltage regulator.
Figure 5:
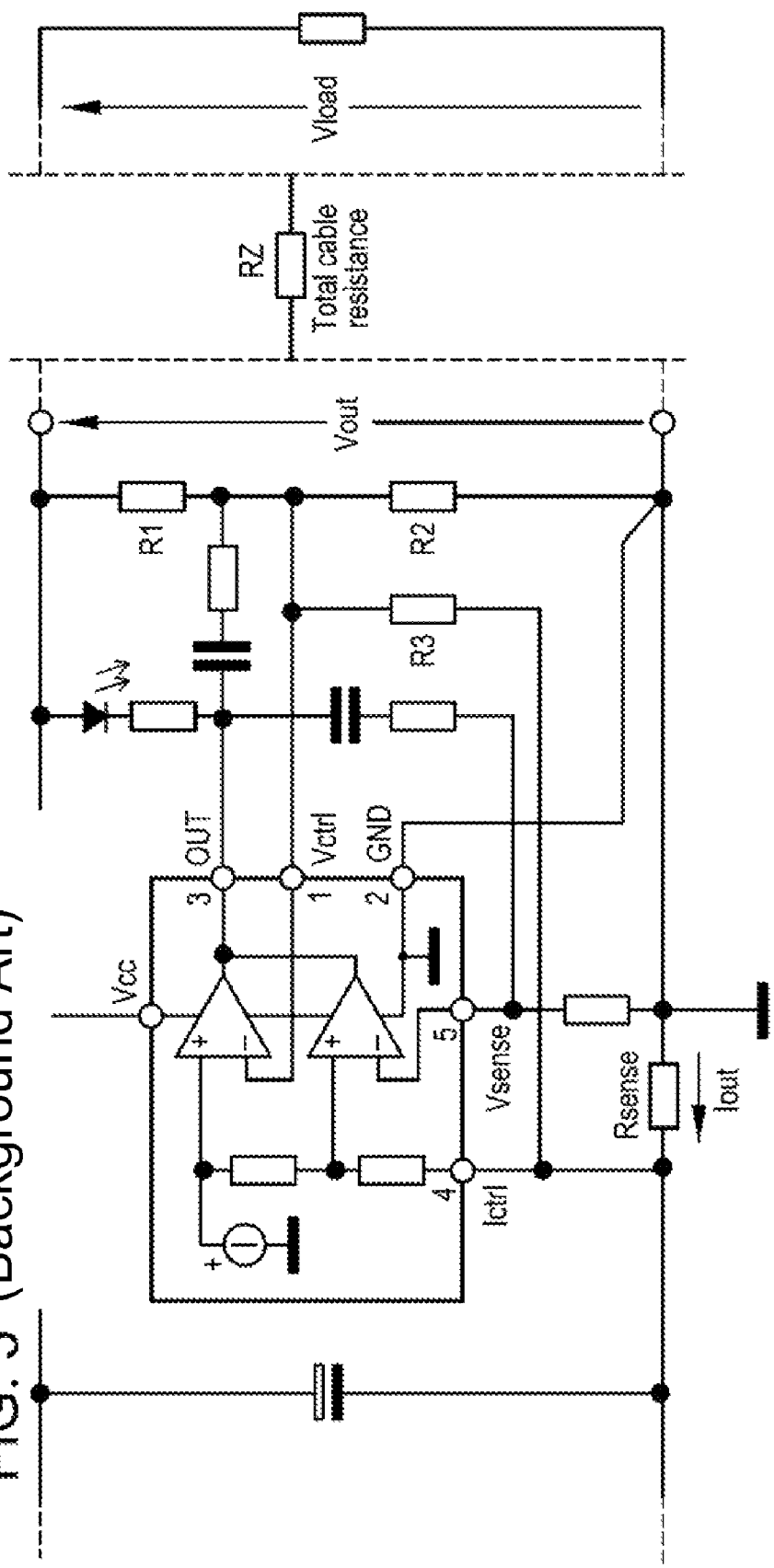
FIG. 5 depicts a known architecture of a voltage regulator.
Figure 6:
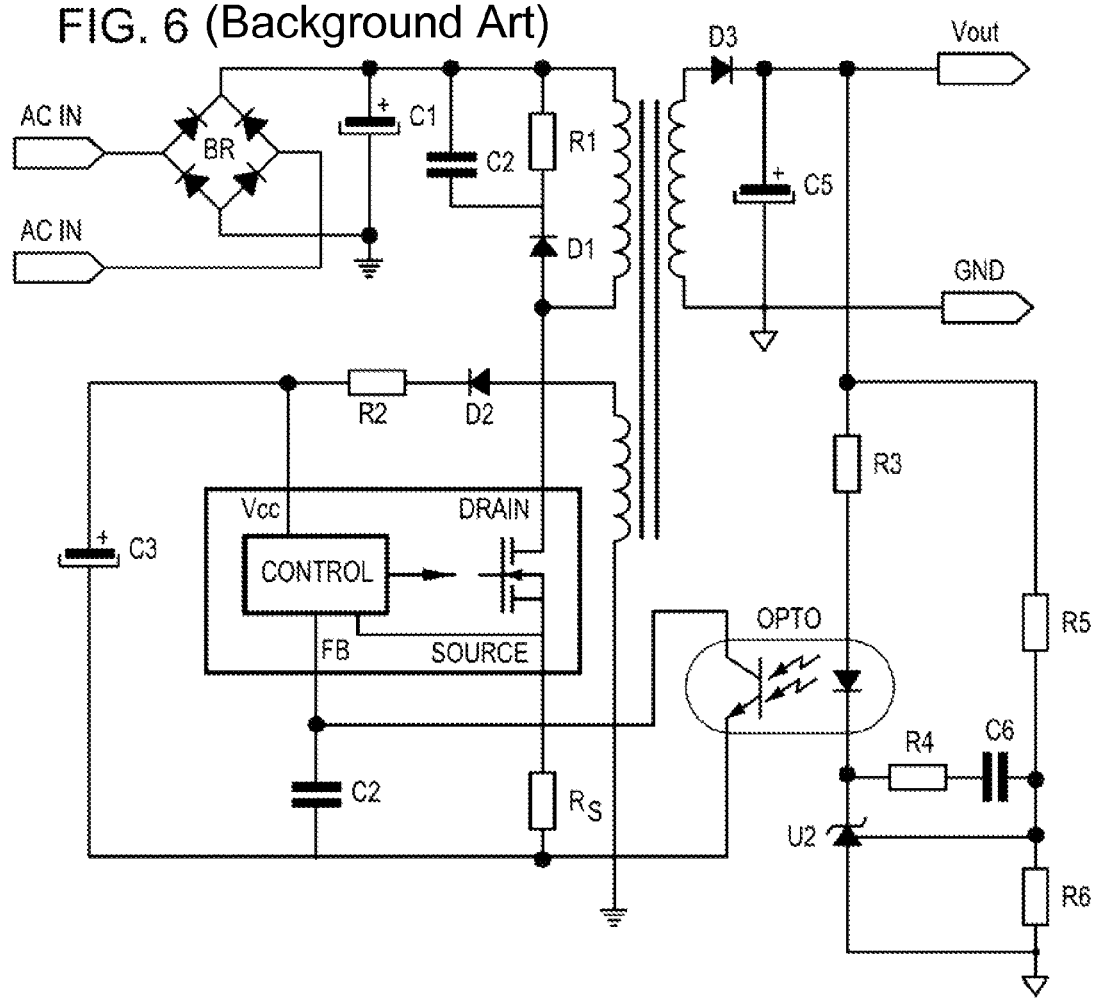
FIG. 6 depicts a known architecture of a voltage regulator.
Figure 7:
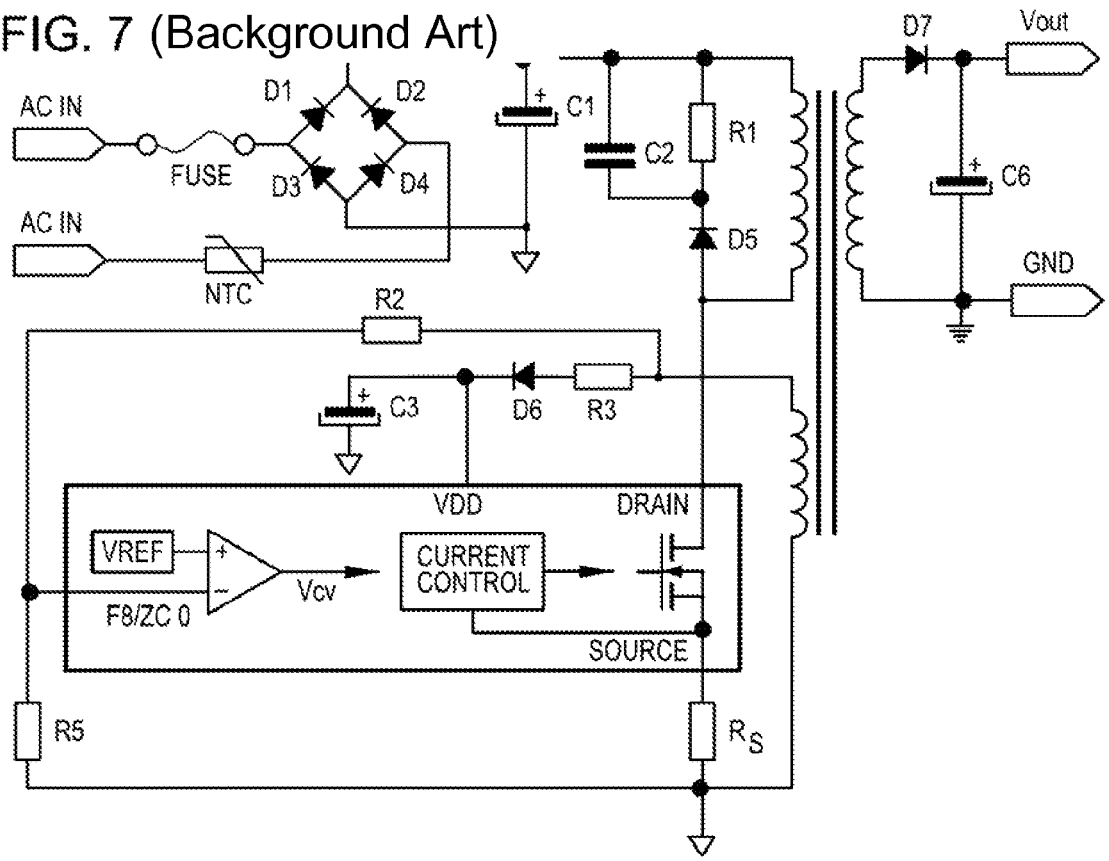
FIG. 7 depicts a known architecture of a voltage regulator.

Moreover, during the voltage regulation, the voltage control loop signal establishes the peak primary current $I_p$:

$$I_P = \frac{V_{CV}}{R_S} \quad (5)$$

wherein $V_{CV}$ is the voltage generated by the error amplifier EAV (in the circuit of FIG. 1) proportional to the difference between the reference voltage $V_{REF}$ and the output voltage $V_{OUT}$ generated by the controller.

Therefore, by combining the equations (4) and (5) it results:

$$U_C = \frac{n}{2} \cdot \frac{R \cdot I_{REF}}{R_S} \cdot \frac{V_{CV}}{I_{OUT}}$$

In the above formula all the signals are known except for the $I_{OUT}$ value.

In the IC controller is inserted a dedicated CDC block for performing the division between the signals $V_{CV}$ and $U_C$ in order to obtain a signal proportional to the output current:

$$\frac{V_{CV}}{U_C} = \frac{2}{n} \cdot \frac{R_S}{R \cdot I_{REF}} \cdot I_{OUT} \quad (6)$$

Figure 13:
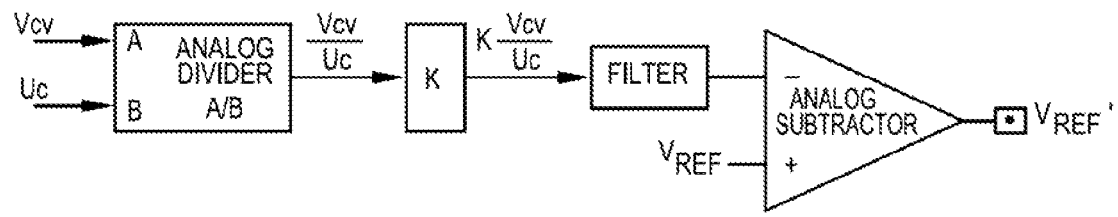
FIG. 13 depicts a first analog embodiment of a CDC circuit block for adjusting the reference voltage of a voltage error amplifier of a switching regulator.

In an embodiment, the CDC block is analog, as depicted in FIG. 13, and comprises an analog divider the output of which is multiplied by a constant k, a filter and an analog subtractor of the output of the filter and the reference voltage $V_{REF}$.

As an alternative, the CDC block could be digital, converting the signals $V_{CV}$ and $U_C$ in digital form, carrying out the division, subtracting the result from the voltage value $V_{REF}$, and converting the result back into an analog signal.

The next step is to adjust the voltage reference $V_{REF}$ by an amount depending on the output current, as explained previously. In fact, the CDC block is designed to implement the following transfer function:

$$V'_{REF} = V_{REF} - k \cdot \frac{2}{n} \cdot \frac{R_S}{R \cdot I_{REF}} \cdot I_{OUT}.$$

The CDC block, during the output voltage regulation, introduces a positive feedback that may compromise the stability of the primary loop. For this reason a low-pass filter is preferably added, as shown in FIG. 13.

Looking at FIG. 13 it is possible to notice the analog divider, the output signal of which is multiplied by a constant k, the filter and the analog subtractor.

Figure 14:
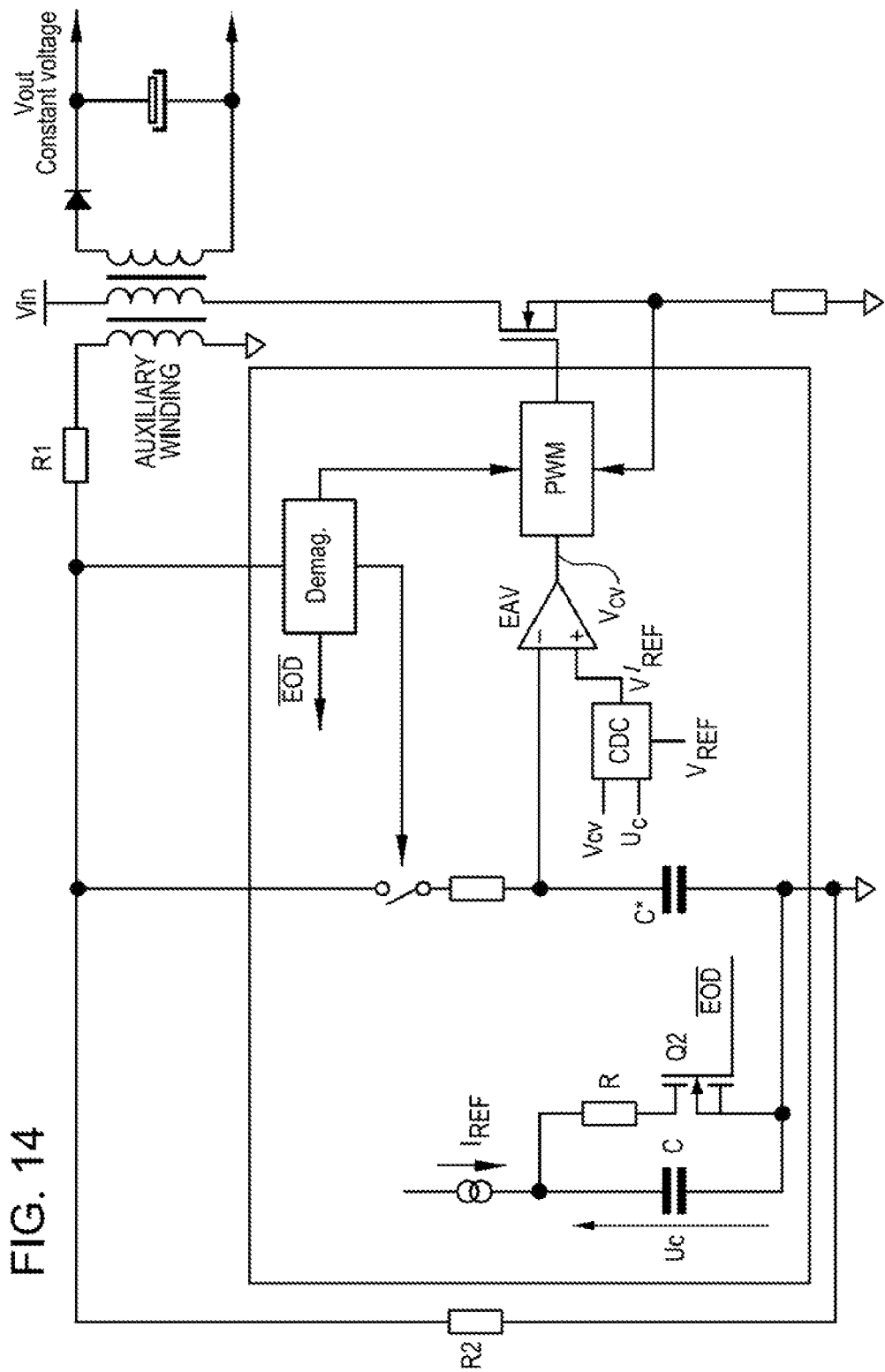
FIG. 14 depicts a first embodiment of a switching regulator that includes a CDC block for adjusting the reference voltage.

FIG. 14 shows the architecture of an embodiment of a voltage mode converter, that includes a CDC block in the primary loop for adjusting the voltage reference value ($V_{REF}$) by an amount proportional to the output current. The new voltage loop reference is $V_{REF}'$. This allows to compensate the voltage drop along the output cable and, ideally, to achieve a zero load regulation.

Figure 15:
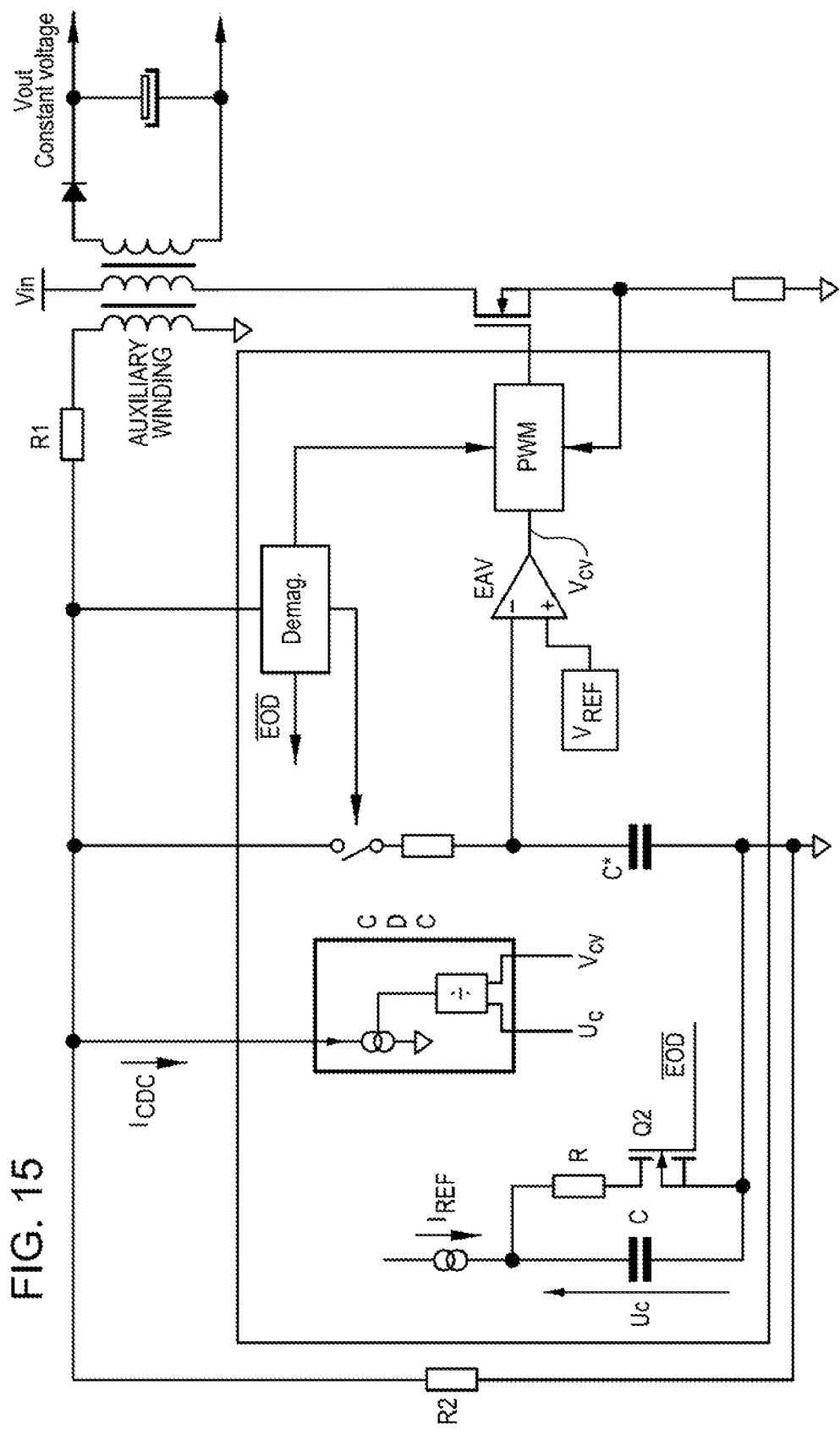
FIG. 15 depicts an alternative embodiment of a switching regulator that includes a CDC block for adjusting the feedback voltage of the regulator.

This technique may be applied even by modifying the feedback voltage on the capacitor C* instead of directly acting on $V_{REF}$. A sample embodiment of this type is shown in FIG. 15, where the CDC block sinks a current proportional to the output current from the feedback resistor divider in order to modify the sampled value:

$$I_{CDC} = k \cdot \frac{2}{n} \cdot \frac{R_S}{R \cdot I_{REF}} \cdot I_{OUT}.$$

Figure 16:
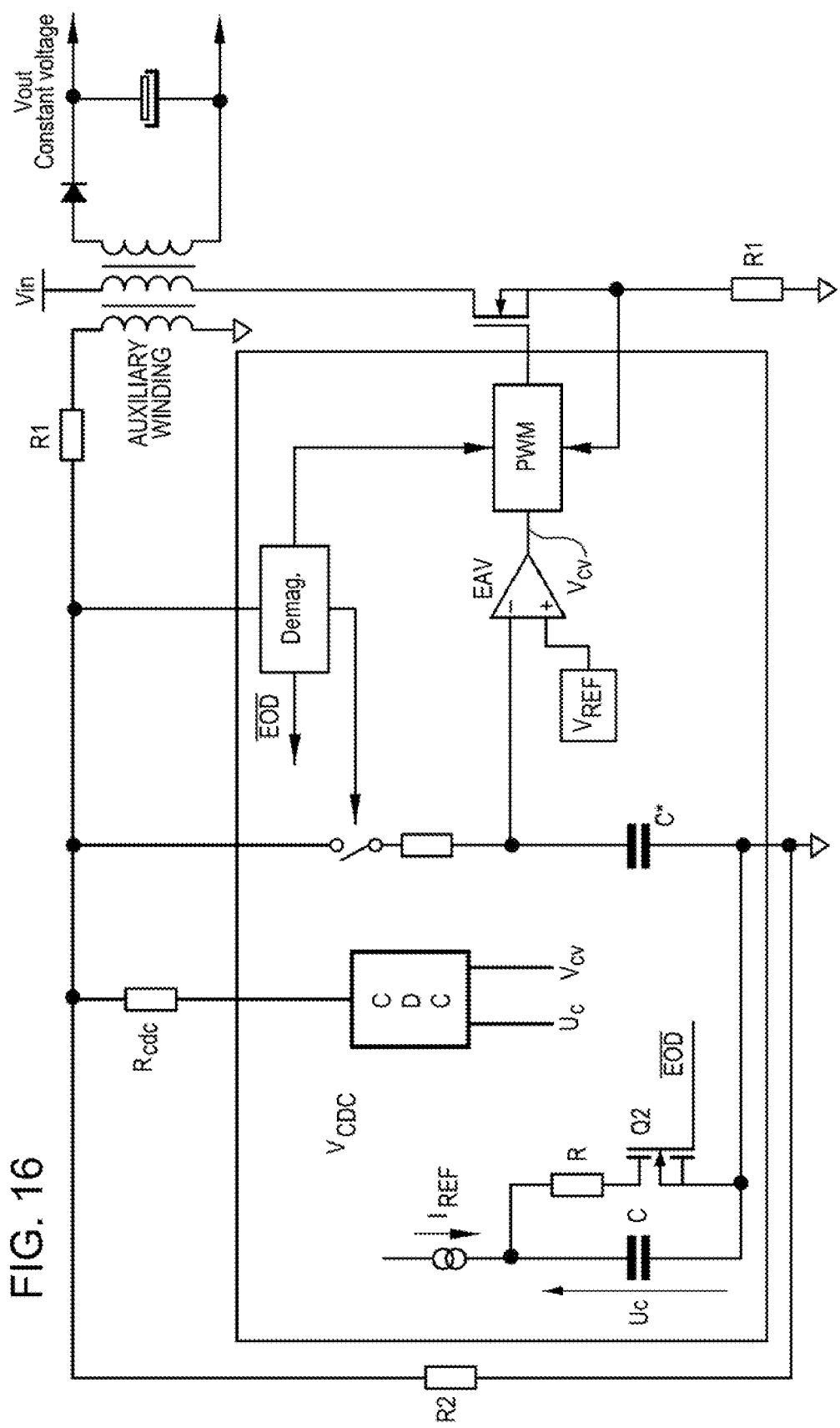
FIG. 16 depicts another alternative embodiment of a switching regulator that includes a CDC block for adjusting the feedback voltage of the regulator.

Another way to modify the voltage feedback signal value is to generate a voltage proportional to the output current:

$$V_{CDC} = V_{REF} - k \cdot \frac{2}{n} \cdot \frac{R_S}{R \cdot I_{REF}} \cdot I_{OUT}$$

and to connect a resistor $R_{CDC}$ as shown in the FIG. 16. The resistor $R_{CDC}$ is an external component which gives the user the possibility to set the CDC gain depending on the application. Its value is calculated by the following equation:

$$R_{CDC} = k \cdot \frac{2}{n} \cdot \frac{N_{OUT}}{N_{AUX}} \cdot \frac{R_1}{R_{cable}} \cdot \frac{R_S}{R \cdot I_{REF}},$$

where, n is the ratio between primary and secondary windings, $N_{OUT}$ is the number of the windings on the secondary, $N_{AUX}$ is the number of the windings on the auxiliary, $R_{cable}$ is the cable resistance and $R_S$ is the sensing resistor connected to the power MOSFET source. The use of that resistor is a possible way to set the CDC gain depending on the application. In fact, applying the previous embodiments, without $R_{CDC}$, the same objective can be reached by trimming the constant k value.

Figure 17:
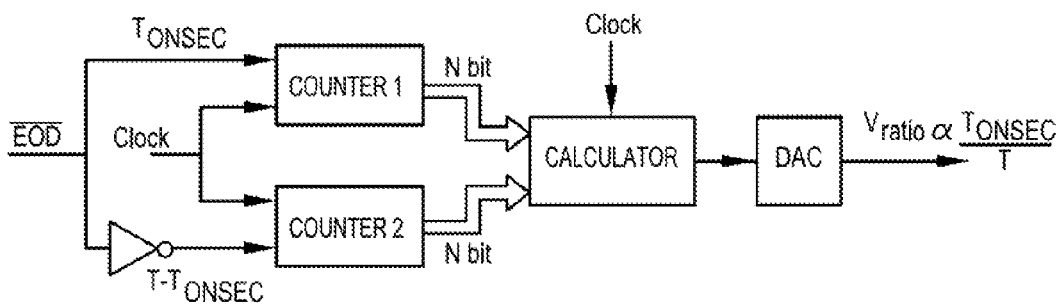
FIG. 17 shows a first digital embodiment of a circuit for generating a signal proportional to the ratio $T_{ONSEC}/T$.

A signal proportional to the ratio $T_{ONSEC}/T$ may be generated by exploiting the logic control signal $\overline{EOD}$ that flags the beginning and the end of magnetization phases, for example using the embodiment of the circuit depicted in FIG. 17. Two pulse counters COUNTER generate digital signals corresponding to the duration of the time intervals $T_{ONSI}$ and $T-T_{ONSEC}$ by counting clock pulses while the signal $\overline{EOD}$ and the inverted replica thereof are active, respectively, then a calculation block DIGITAL CALCULATOR generates a digital signal that represents the ratio $T_{ONSEC}/T$, that is converted in a corresponding analog signal Vratio by a digital-to-analog converter DAC.

If the CDC block can be input with digital signals, then the converter DAC is not necessary.

Figure 18:
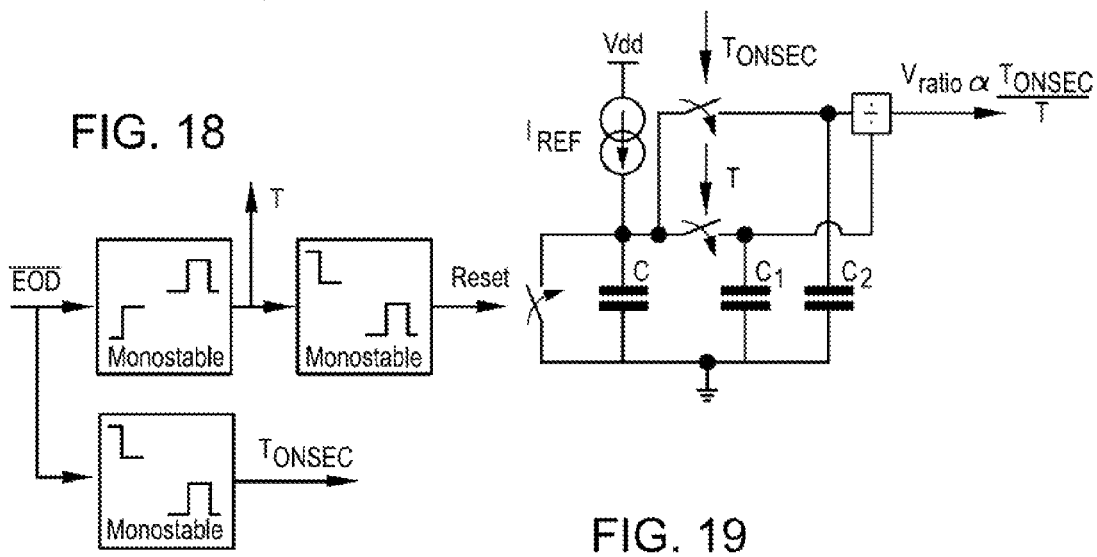
FIG. 18 shows an alternative digital embodiment of a circuit for generating a signal proportional to the ratio $T_{ONSEC}/T$.

According to an alternative embodiment, a signal proportional to the ratio $T_{ONSEC}/T$ may be generated by the circuit of FIG. 18, that uses three monostable flip-flops for switching three capacitors C, C1 and C2. In correspondence of the leading edge of the signal $\overline{EOD}$, the charge voltage of the capacitor C is sampled and held on the capacitor C1, and the capacitor C is discharged (signal RESET). The capacitor C is charged again by the current generator IREF and its charge voltage is sampled and held on the capacitor C2 when the signal $\overline{EOD}$ switches low (that is at the end of each demagnetization phase). Therefore, the charge voltages VC1 and VC2 of the capacitors C1 and C2 represent the duration of a period and of the magnetization phase, respectively:

$$V_{C1} = \frac{I_{REF}}{C} \cdot T, \; V_{C2} = \frac{I_{REF}}{C} \cdot T_{ONSEC}$$

A divider generates the signal Vratio as the ratio $V_{C2}/V_{C1}$.

The signal RESET used for discharging the capacitor C is substantially a delayed replica of the pulse T, such to zero the charge voltage of the capacitor C substantially immediately after it has been held on the capacitor C1.

Figure 19:
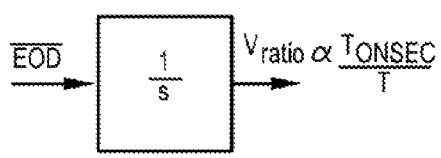
FIG. 19 shows a first analog embodiment of a circuit for generating a signal proportional to the ratio $T_{ONSEC}/T$.

According to an alternative embodiment, the voltage Vratio may be generated by integrating the signal $\overline{EOD}$ over a switching period T, as schematically depicted in FIG. 19.

Figure 20:
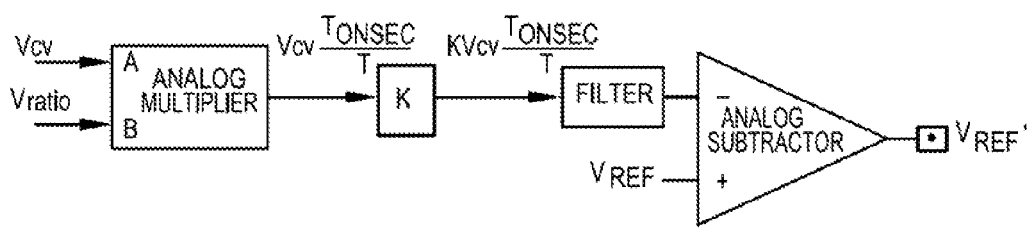
FIG. 20 depicts an alternative analog embodiment of a circuit for generating a signal proportional to the ratio $T_{ONSEC}/T$.

A CDC block suitable for using the voltage Vratio for adjusting the reference voltage VREF' is depicted in FIG. 20. This CDC block is similar to that depicted in FIG. 13, but it has an input multiplier instead of an input divider.

Figure 21:
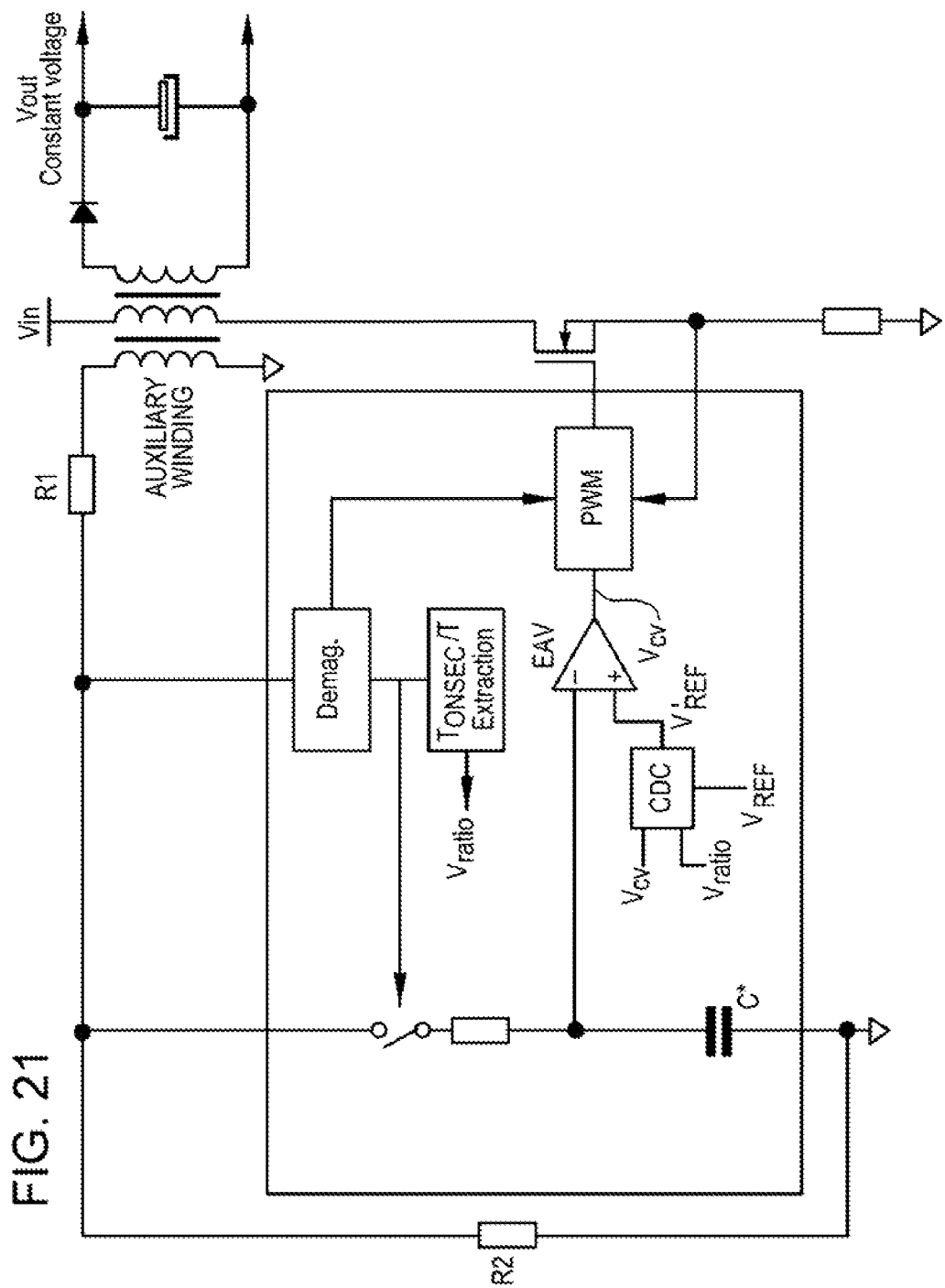
FIG. 21 depicts another embodiment of a switching regulator that includes the CDC block for adjusting the reference voltage and a circuit for generating a signal proportional to the ratio $T_{ONSEC}/T$.

An embodiment of a switching regulator that employs the CDC block of FIG. 20 and a circuit for generating a voltage Vratio proportional to the ratio $T_{ONSEC}/T$, such as the circuits of FIGS. 17 to 19, is shown in FIG. 21. The functioning of this switching regulator is evident in view of the description made referring to FIGS. 14 to 16. Furthermore, some to all of the components of the switching regulator of FIG. 21 may be disposed on an Integrated Circuit (IC) die, and the regulated output voltage $V_{OUT}$ may provide power to a circuit, such as a controller processor, that is disposed on the same die or on a different die.

Naturally, in order to satisfy local and specific requirements, a person skilled in the art may apply to the solution described above many modifications and alterations. Particularly, although the present subject matter has been described with a certain degree of particularity with reference to described embodiment(s) thereof, it should be understood that various omissions, substitutions and changes in the form and details as well as other embodiments are possible. Moreover, it is expressly intended that specific elements and/or method steps described in connection with any disclosed embodiment of the disclosure may be incorporated in any other embodiment as a general matter of design choice.

What is claimed is:

1. A power-supply controller, comprising:
   a switching-control circuit operable to control a switch coupled to a primary winding of a transformer;
   an error amplifier having a first input node operable to receive a first feedback signal from an auxiliary winding of the transformer, a second input node operable to receive a comparison signal, and an output node operable to provide a control signal to the switching-control circuit; and
   a comparison-signal generator operable to generate the comparison signal in response to a first compensation signal that is isolated from a secondary winding of the transformer and that is proportional to a load current through a conductor disposed between the secondary winding and a load, the first compensation signal derived from a signal independent of the secondary winding.

2. The power-supply controller of claim 1 wherein the switching control circuit comprises a comparator having a first input node operable to receive the control signal from the error amplifier, a second input node operable to receive a second feedback signal that is proportional to a current through the primary winding, and an output node operable to be coupled to a control node of the switch.

3. The power-supply controller of claim 1 wherein the feedback, comparison, and control signals respectively comprise feedback, comparison, and control voltages.

4. The power-supply controller of claim 1 wherein the first compensation signal is operable to have a first level while a non-zero current flows through the secondary winding and to 5. A power-supply controller, comprising:
a switching-control circuit operable to control a switch coupled to a primary winding of a transformer;
an error amplifier having a first input node operable to receive a first feedback signal from an auxiliary winding of the transformer, a second input node operable to receive a comparison signal, and an output node operable to provide a control signal to the switching-control circuit; and
a comparison-signal generator operable to generate the comparison signal in response to a first compensation signal that is isolated from a secondary winding of the transformer and that is proportional to a load current through a conductor disposed between the secondary winding and a load;
wherein the first compensation signal is proportional to a ratio of a time during which current flows through the secondary winding to a period during which the switching-control circuit activates and deactivates the switch.

6. A power-supply controller, comprising:
a switching-control circuit operable to control a switch coupled to a primary winding of a transformer;
an error amplifier having a first input node operable to receive a first feedback signal from an auxiliary winding of the transformer, a second input node operable to receive a comparison signal, and an output node operable to provide a control signal to the switching-control circuit;
a comparison-signal generator operable to generate the comparison signal in response to a first compensation signal that is isolated from a secondary winding of the transformer and that is proportional to a load current through a conductor disposed between the secondary winding and a load; and
a compensation circuit operable to generate the first compensation signal from a second compensation signal that is isolated from the secondary winding and that is proportional to the load current.

7. The power-supply controller of claim 6 wherein the compensation circuit is operable to generate the first compensation signal from the second compensation signal and from a reference signal.

8. The power-supply controller of claim 6 wherein the compensation circuit is operable to generate the first compensation signal from the second compensation signal and from a reference current.

9. The power-supply controller of claim 6 wherein the first and second compensation signals respectively comprise first and second compensation voltages.

10. The power-supply controller of claim 1 wherein the comparison-signal generator is operable to generate the comparison signal in response to a reference signal.

11. The power-supply controller of claim 1 wherein the comparison-signal generator is operable to generate the comparison signal in response to a reference voltage.

12. The power-supply controller of claim 1 wherein the comparison-signal generator is operable to generate the comparison signal in response to the control signal.

13. The power-supply controller of claim 1 wherein the comparison-signal generator is operable to generate the comparison signal in response to the control signal and a reference signal.

14. A power-supply controller, comprising:
a switching-control circuit operable to control a switch coupled to a primary winding of a transformer;
an error amplifier having a first input node operable to receive a first feedback signal from an auxiliary winding of the transformer, a second input node operable to receive a comparison signal, and an output node operable to provide a control signal to the switching-control circuit; and
a comparison-signal generator operable to generate the comparison signal in response to a first compensation signal that is isolated from a secondary winding of the transformer and that is proportional to a load current through a conductor disposed between the secondary winding and a load;
wherein the comparison-signal generator is operable to generate the comparison signal equal to a difference between a reference voltage and a ratio of the control signal to the first compensation signal.

15. The power-supply controller of claim 1 wherein the load current substantially equals a current flowing through the secondary winding.

16. A power-supply controller, comprising:
a switching-control circuit operable to control a switch coupled to a primary winding of a transformer;
an error amplifier having a first input node operable to receive a first feedback signal, a second input node operable to receive a reference signal, and an output node operable to provide a control signal to the switching-control circuit; and
a feedback-signal generator operable to generate the first feedback signal in response to a first compensation signal that is isolated from a secondary winding of the transformer and that is proportional to a load current through a conductor disposed between the secondary winding and a load, the first compensation signal derived only from signals independent of the secondary winding;
wherein the switching circuit comprises a comparator having a first input node operable to receive the control signal from the error amplifier, a second input node operable to receive a second feedback signal that is proportional to a current through the primary winding, and an output node operable to be coupled to a control node of the switch.

17. The power-supply controller of claim 16 wherein the feedback, reference, and control signals respectively comprise feedback, reference, and control voltages.

18. The power-supply controller of claim 16 wherein the first compensation signal is operable to have a first level while a non-zero current flows through the secondary winding and to have a second level while a substantially zero current flows through the secondary winding.

19. The power-supply controller of claim 16 wherein the first compensation signal comprises a substantially DC compensation voltage.

20. A power-supply controller, comprising:
a switching-control circuit operable to control a switch coupled to a primary winding of a transformer;
an error amplifier having a first input node operable to receive a first feedback signal, a second input node operable to receive a reference signal, and an output node operable to provide a control signal to the switching-control circuit; and
a feedback-signal generator operable to generate the first feedback signal in response to a first compensation signal that is isolated from a secondary winding of the transformer and that is proportional to a load current through a conductor disposed between the secondary winding and a load;

wherein the first compensation signal is proportional to a ratio of a time during which current flows through the secondary winding to a period during which the switching-control circuit activates and deactivates the switch.

21. A power-supply controller, comprising:
a switching-control circuit operable to control a switch coupled to a primary winding of a transformer;
an error amplifier having a first input node operable to receive a first feedback signal, a second input node operable to receive a reference signal, and an output node operable to provide a control signal to the switching-control circuit;
a feedback-signal generator operable to generate the first feedback signal in response to a first compensation signal that is isolated from a secondary winding of the transformer and that is proportional to a load current through a conductor disposed between the secondary winding and a load; and
a compensation circuit operable to generate the first compensation signal from a second compensation that is isolated from the secondary winding and that is proportional to the load current.

22. The power-supply controller of claim 21 wherein the compensation circuit is operable to generate the first compensation signal from the second compensation signal and from a reference signal.

23. The power-supply controller of claim 21 wherein the compensation circuit is operable to generate the first compensation signal from the second compensation signal and from a reference current.

24. The power-supply controller of claim 21 wherein the first and second compensation signals respectively comprise first and second compensation voltages.

25. The power-supply controller of claim 16 wherein the feedback-signal generator is operable to generate the first feedback signal in response to a signal from an auxiliary winding of the transformer.

26. The power-supply controller of claim 16 wherein the feedback-signal generator is operable to generate the first feedback signal in response to a voltage across an auxiliary winding of the transformer.

27. The power-supply controller of claim 16 wherein the feedback-signal generator is operable to generate the first feedback signal in response to the control signal.

28. The power-supply controller of claim 16 wherein the first feedback-signal generator is operable to generate the feedback signal in response to the control signal and a signal from an auxiliary winding of the transformer.

29. A power-supply controller, comprising:
a switching-control circuit operable to control a switch coupled to a primary winding of a transformer;
an error amplifier having a first input node operable to receive a first feedback signal, a second input node operable to receive a reference signal, and an output node operable to provide a control signal to the switching-control circuit; and
a feedback-signal generator operable to generate the first feedback signal in response to a first compensation signal that is isolated from a secondary winding of the transformer and that is proportional to a load current through a conductor disposed between the secondary winding and a load;

wherein the feedback-signal generator is operable to generate the feedback signal inversely proportional to a ratio of the control signal to the first compensation signal.

30. The power-supply controller of claim 16 wherein the load current substantially equals a current flowing through the secondary winding.

31. A power supply, comprising:
a transformer having primary, secondary, and auxiliary windings;
a switch serially coupled to the primary winding; and
a power-supply controller, comprising
a switching-control circuit operable to control the switch,
an error amplifier having a first input node operable to receive a first feedback signal from the auxiliary winding, a second input node operable to receive a comparison signal, and an output node operable to provide a control signal to the switching-control circuit, and
a comparison-signal generator operable to generate the comparison signal in response to a first compensation signal that is isolated from the secondary winding and derived from signals only associated with the primary winding and that is proportional to a load current through a conductor disposed between the secondary winding and a load.

32. The power supply of claim 31 wherein the switch comprises a transistor.

33. A power supply, comprising:
a transformer having primary, secondary, and auxiliary windings;
a switch serially coupled to the primary winding; and
a power-supply controller, comprising
a switching-control circuit operable to control the switch,
an error amplifier having a first input node operable to receive a first feedback signal, a second input node operable to receive a reference signal, and an output node operable to provide a control signal to the switching-control circuit, and
a feedback-signal generator operable to generate the first feedback signal in response to a first compensation signal that is isolated from a secondary winding and derived from signals only associated with the primary winding and that is proportional to a load current through a conductor disposed between the secondary winding and a load
wherein the switching circuit comprises a comparator having a first input node operable to receive the control signal from the error amplifier, a second input node operable to receive a second feedback signal that is proportional to a current through the primary winding, and an output node operable to be coupled to a control node of the switch.

34. The power supply of claim 33 wherein the switch comprises a transistor.

35. A system, comprising:
a load;
a conductor having a first node coupled to the load and having a second node; and
a power supply comprising
a transformer having a primary winding, a secondary winding coupled to the second node of the conductor, and an auxiliary winding,
a switch serially coupled to the primary winding, and a power-supply controller, comprising
  a switching-control circuit operable to control the switch,
  an error amplifier having a first input node operable to receive a first feedback signal from the auxiliary winding, a second input node operable to receive a comparison signal, and an output node operable to provide a control signal to the switching-control circuit, and
  a comparison-signal generator operable to generate the comparison signal in response to a first compensation signal that is isolated from the secondary winding of the transformer and derived from a signal through the primary winding that is proportional to a current through the conductor.

36. The system of claim 35 wherein the load and the power-supply controller are disposed on a same integrated-circuit die.

37. The system of claim 35 wherein the load, the power-supply controller, and the switch are disposed on a same integrated-circuit die.

38. The system of claim 35 wherein the load, the conductor, and the power supply are disposed on a same integrated-circuit die.

39. The system of claim 35 wherein the load comprises a controller.

40. The system of claim 35 wherein the load and the power-supply controller are disposed on separate integrated-circuit dies.

41. The system of claim 35 wherein the load and the conductor are disposed on a same integrated-circuit die.

42. The system of claim 35 wherein:
the load is disposed on a first integrated-circuit die;
the power-supply controller is disposed on a second integrated-circuit die; and
the conductor is disposed between the first and second dies.

43. A system, comprising:
a load;
a conductor having a first node coupled to the load and having a second node; and
a power supply, comprising
  a transformer having primary, secondary, and auxiliary windings,
  a switch serially coupled to the primary winding, and
  a power-supply controller, comprising
    a switching-control circuit operable to control the switch,
    an error amplifier having a first input node operable to receive a first feedback signal from the auxiliary winding, a second input node operable to receive a reference signal, and an output node operable to provide a control signal to the switching-control circuit, and
    a feedback-signal generator operable to generate the first feedback signal in response to a first compensation signal that is derived from the primary winding and isolated from a secondary winding and that is proportional to a load current through a conductor disposed between the secondary winding and a load.

44. The system of claim 43 wherein the load and the power-supply controller are disposed on a same integrated-circuit die.

45. The system of claim 43 wherein the load, the power-supply controller, and the switch are disposed on a same integrated-circuit die.

46. The system of claim 43 wherein the load, the conductor, and the power supply are disposed on a same integrated-circuit die.

47. The system of claim 43 wherein the load comprises a controller.

48. The system of claim 43 wherein the load and the power-supply controller are disposed on separate integrated-circuit dies.

49. The system of claim 43 wherein the load and the conductor are disposed on a same integrated-circuit die.

50. The system of claim 43 wherein:
the load is disposed on a first integrated-circuit die;
the power-supply controller is disposed on a second integrated-circuit die; and
the conductor is disposed between the first and second dies.

51. A method, comprising:
generating a regulated output voltage with a secondary winding of a transformer;
generating a comparison signal in response to a first compensation signal that is isolated from, and that is proportional to a current through, the secondary winding, the first comparison signal derived from current through the primary winding;
generating a control signal in response to the comparison signal and in response to a first feedback signal from an auxiliary winding of the transformer; and
switching a current through a primary winding of the transformer in response to the control signal;
wherein the comparison signal is equal to a difference between a reference voltage and a ratio of the control signal to the first compensation signal.

52. The method of claim 51, further comprising:
generating the first compensation signal having a first level while a non-zero current flows through the secondary winding; and
generating the first compensation signal having a second level otherwise.

53. A method, comprising:
generating a regulated output voltage with a secondary winding of a transformer;
generating a comparison signal in response to a first compensation signal that is isolated from, and that is proportional to a current through, the secondary winding;
generating a control signal in response to the comparison signal and in response to a first feedback signal from an auxiliary winding of the transformer;
switching a current through a primary winding of the transformer in response to the control signal; and
generating the first compensation signal proportional to a ratio of a time during which current flows through the secondary winding to a period with which current is switched through the primary winding.

54. A method, comprising:
generating a regulated output voltage with a secondary winding of a transformer;
generating a comparison signal in response to a first compensation signal that is isolated from, and that is proportional to a current through, the secondary winding;
generating a control signal in response to the comparison signal and in response to a first feedback signal from an auxiliary winding of the transformer;
switching a current through a primary winding of the transformer in response to the control signal;
generating the first compensation signal from a second compensation signal that is isolated from the secondary winding and that is proportional to the current through the secondary winding.

55. The method of claim 54 wherein generating the first compensation signal comprises generating the first compensation signal from the second compensation signal and from a reference signal.

56. The method of claim 51 wherein generating the comparison signal comprises generating the comparison signal in response to a reference signal.

57. The method of claim 51 wherein generating the comparison signal comprises generating the comparison signal in response to the control signal.

58. The method of claim 51 wherein generating the comparison signal comprises generating the comparison signal in response to the control signal and a reference signal.

59. The method of claim 51 wherein the first compensation signal is proportional to an average current through the secondary winding.

60. A method, comprising:
generating a regulated output voltage with a secondary winding of a transformer;
generating a feedback signal in response to a first compensation signal that is isolated from, and that is proportional to a current through the secondary winding, the first compensation signal derived from current through the primary winding and independent of current through the secondary winding;
generating a control signal in response to a reference signal and in response to the feedback signal; and
switching a current through a primary winding of the transformer in response to the control signal.

61. A method, comprising:
generating a regulated output voltage with a secondary winding of a transformer;
generating a feedback signal in response to a first compensation signal that is isolated from, and that is proportional to a current through, the secondary winding;
generating a control signal in response to a reference signal and in response to the feedback signal;
switching a current through a primary winding of the transformer in response to the control signal; and
generating the first compensation signal proportional to a ratio of a time during which current flows through the secondary winding to a period with which current is switched through the primary winding.

62. A method, comprising:
generating a regulated output voltage with a secondary winding of a transformer;
generating a feedback signal in response to a first compensation signal that is isolated from, and that is proportional to a current through, the secondary winding;
generating a control signal in response to a reference signal and in response to the feedback signal;
switching a current through a primary winding of the transformer in response to the control signal; and
generating the first compensation signal from a second compensation signal that is isolated from the secondary winding and that is proportional to the current through the secondary winding.

63. The method of claim 62 wherein generating the first compensation signal comprises generating the first compensation signal from the second compensation signal and from a reference signal.

64. The method of claim 60 wherein generating the feedback signal comprises generating the feedback signal in response to a signal from an auxiliary winding of the transformer.

65. The method of claim 60 wherein generating the feedback signal comprises generating the feedback signal in response to the control signal.

66. The method of claim 60 wherein generating the feedback signal comprises generating the first feedback signal in response to the control signal and a signal from an auxiliary winding of the transformer.

67. A method, comprising:
generating a regulated output voltage with a secondary winding of a transformer;
generating a feedback signal in response to a first compensation signal that is isolated from, and that is proportional to a current through, the secondary winding;
generating a control signal in response to a reference signal and in response to the feedback signal; and
switching a current through a primary winding of the transformer in response to the control signal;
wherein generating the feedback signal comprises generating the feedback signal inversely proportional to a ratio of the control signal to the first compensation signal.

* * * * *